(12) United States Patent
Mizuno (10) Patent No.: US 11,661,034 B2
(45) Date of Patent: May 30, 2023

(54) WIPER CONTROL DEVICE

(71) Applicant: DENSO CORPORATION, Kariya (JP)

(72) Inventor: Kota Mizuno, Kariya (JP)

(73) Assignee: DENSO CORPORATION, Kariya (JP)

( * ) Notice: Subject to any disclaimer, the term of this patent is extended or adjusted under 35 U.S.C. 154(b) by 281 days.

(21) Appl. No.: 16/298,749

(22) Filed: Mar. 11, 2019

(65) Prior Publication Data

US 2019/0299934 A1 Oct. 3, 2019

(30) Foreign Application Priority Data

Mar. 28, 2018 (JP) .............................. JP2018-062450

(51) Int. Cl.

| *H02P 3/08* | (2006.01) |
| *H02P 1/40* | (2006.01) |
| *H02P 6/16* | (2016.01) |
| *B60S 1/08* | (2006.01) |
| *H02P 23/18* | (2016.01) |
| *H02P 23/04* | (2006.01) |

(52) U.S. Cl.

CPC ................ *B60S 1/08* (2013.01); *H02P 23/04* (2013.01); *H02P 23/183* (2016.02); *B60S 1/0803* (2013.01)

(58) Field of Classification Search

CPC .......... B60W 30/143; B60S 1/026; B60S 1/62
See application file for complete search history.

(56) References Cited

U.S. PATENT DOCUMENTS

| 6,249,098 | B1* | 6/2001 | Miyazaki ................. B60S 1/08 |
| | | | 15/250.12 |
| 7,135,801 | B2* | 11/2006 | Yagi .................... H02K 7/1166 |
| | | | 310/239 |
| 2016/0339872 | A1* | 11/2016 | Amagasa .............. B60S 1/0807 |

FOREIGN PATENT DOCUMENTS

| JP | 2002-178881 A | 6/2002 |
| JP | 2002-264776 A | 9/2002 |
| JP | 2009-29216 A | 2/2009 |
| JP | 2014-83893 A | 5/2014 |

\* cited by examiner

*Primary Examiner* — Kawing Chan
*Assistant Examiner* — Charles S Laughlin
(74) *Attorney, Agent, or Firm* — Oliff PLC (57) ABSTRACT

A wiper motor control circuit controls a drive circuit such that an actual speed of a wiper speed computed based on change in a rotation angle of an output shaft of the wiper motor detected by a rotation angle sensor that detects the rotation angle becomes a target speed corresponding to a position of a wiper blade indicated by the rotation angle detected by the rotation angle sensor. The wiper motor control circuit also controls the drive circuit so as to apply a braking current in the wiper motor when the actual speed has exceeded a threshold value when the rotation angle detected by the rotation angle sensor indicates a return position of the wiper blade.

12 Claims, 7 Drawing Sheets

WIPER CONTROL DEVICE

CROSS-REFERENCE TO RELATED APPLICATION

This application is based on and claims priority under 35 USC 119 from Japanese Patent Application No. 2018-062450 filed on Mar. 28, 2018, the disclosure of which is incorporated by reference herein.

BACKGROUND

Technical Field

The present disclosure relates to a wiper control device.

Background Art

In a return control wiper that changes the direction of a wiping action of a wiper blade at a return position, when an angle detected by an absolute angle sensor attached to an output shaft of a wiper motor indicates a return position, the wiper motor is rotated in reverse by switching a current through the wiper motor to the opposite direction, thereby changing the direction of the wiping action of the wiper blade.

In control to detect when the wiper blade has reached the return position using the absolute angle sensor and then rotate the wiper motor in reverse, if the timing at which the rotation is reversed is too slow, the wiper blade could pass through the return position, causing what is referred to as overrun to occur.

Japanese Patent Application Laid-Open (JP-A) No. 2014-83893 (Patent Document 1) discloses an invention relating to a wiper control device that controls a wiping action in a conventional manner as long as an actual position where a wiper blade changes direction is within a permitted range. When, however, the actual position where the wiper blade changes direction is outside the permitted range, the wiper control device controls to bring forward the timing at which the rotation speed of the wiper motor is reduced.

However, in the wiper control device of Patent Document 1, proportional integral (PI) control to cause the actual wiping speed (wiper speed) to approach a target speed is continued even after the wiper blade has reached the return position. Overrun is accordingly difficult to suppress, and deviation between the target speed and the wiper speed increases. In order to eliminate increased deviation, a PI duty indicating the voltage to be applied to the wiper motor needs to be increased, which might lead to problems such as sudden acceleration in the wiper speed, the occurrence of hunting, or the like.

Figure 7:
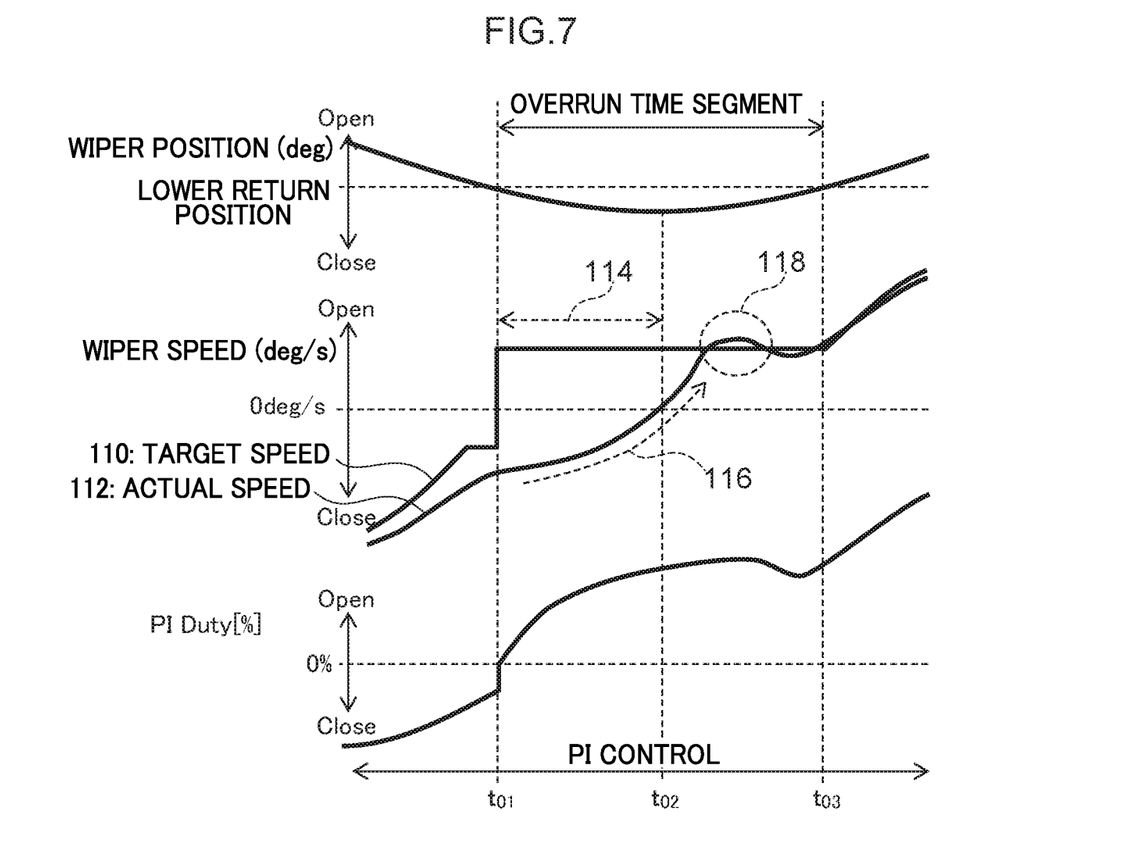
FIG. 7 is a schematic diagram illustrating correspondence relationships between wiper position, target speed, actual speed of a wiper speed, and PI Duty when PI control is performed even after wiper blades have reached a lower return position.

FIG. 7 is a schematic diagram illustrating a case in which PI control is performed even after a wiper blade has reached a lower return position. FIG. 7 illustrates correspondence relationships between the wiper position, a target speed 110, an actual speed 112 of the wiper speed, and a PI duty. The target speed 110 does not anticipate overrun of the wiper blade at time $t_{01}$, and indicates a predetermined value of 0 deg/s or greater in a time segment 114 from time $t_{01}$ to time $t_{02}$ so as to rapidly accelerate the wiper speed after changing direction. However, since the wiper blade overruns in the case illustrated in FIG. 7, the actual speed 112 deviates greatly from the target speed 110 indicating the predetermined value. In the PI control, in order to eliminate this deviation, rapid acceleration 116 of the actual speed 112 is performed as illustrated in FIG. 7, which may result in the occurrence of hunting 118 or the like.

SUMMARY

In consideration of the above, an object of the present disclosure is to provide a wiper control device capable of suppressing overrun that has occurred.

In order to address the above issue, a wiper control device according to a first aspect includes a drive circuit, a rotation angle detection sensor, and a control circuit. The drive circuit drives a wiper motor so as to cause a wiper blade to perform a wiping action. The rotation angle detection section detects a rotation angle of an output shaft of the wiper motor. The control circuit controls the drive circuit based on a rotation angle detected by the rotation angle detection sensor such that a rotation speed of the wiper motor becomes a target speed corresponding to a wiping position of the wiper blade determined according to the rotation angle, and controls the drive circuit so as to apply a braking current in the wiper motor when the wiper blade has reached a return position of the wiper blade as determined according to the rotation angle and the rotation speed of the wiper motor has exceeded a threshold value.

This wiper control device enables overrun that has occurred to be suppressed by applying a braking current when the wiper blade has overrun.

A wiper control device according to a second aspect is the wiper control device according to the first aspect, wherein when the braking current is applied, the control circuit continues the braking current application until the rotation speed of the wiper motor becomes the threshold value or lower.

This wiper control device suppresses overrun that has occurred by applying the braking current until a wiping speed becomes a threshold value or lower when the wiper blade has overrun.

A wiper control device according to a third aspect is the wiper control device of the first aspect or the second aspect, wherein when the control circuit controls the drive circuit based on the rotation angle, the control circuit performs PI control based on deviation between the rotation speed and the target speed, halts the PI control during the braking current application, and resumes the PI control when the braking current application has ended.

When the wiper blade has overrun, this wiper control device applies the braking current and halts the PI control, and then resumes the PI control when the braking current application has ended, thereby enabling sudden acceleration in the wiping speed (wiper speed) after changing direction to be suppressed, and enabling hunting in the wiping action to be prevented.

A wiper control device according to a fourth aspect is the wiper control device of any one of the first aspect to the third aspect, wherein the control circuit continues the braking current application until the rotation speed of the wiper motor has become zero.

This wiper control device suppresses overrun that has occurred by performing the braking current application until the wiping speed has become zero when the wiper blade has overrun.

DETAILED DESCRIPTION

Figure 1:
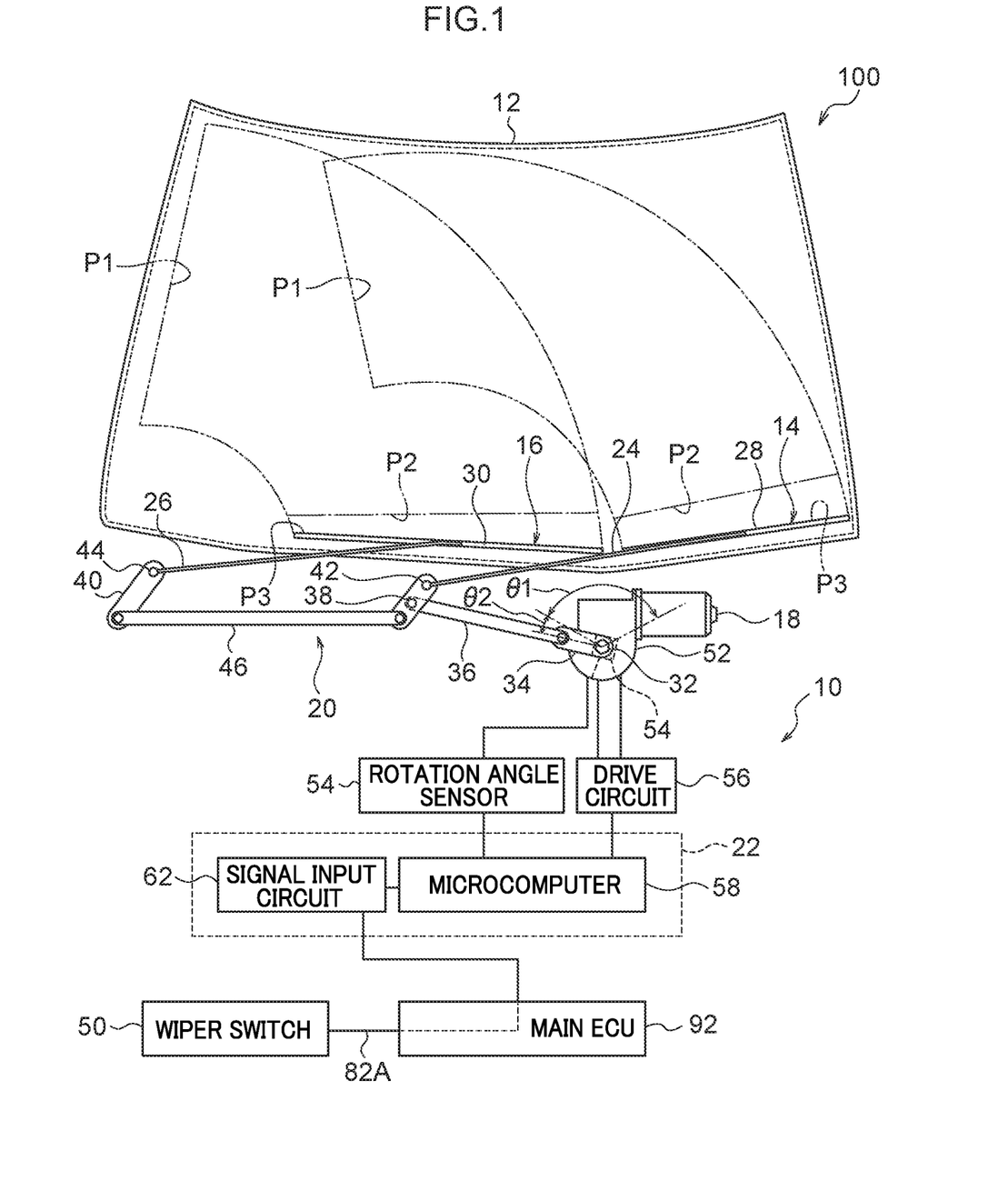
FIG. 1 is a schematic diagram illustrating a configuration of a wiper device including a wiper control device according to an exemplary embodiment of the present disclosure.

FIG. 1 is a schematic diagram illustrating a configuration of a wiper device 100 including a wiper control device 10 according to an exemplary embodiment. The wiper device 100 is, for example, a device for wiping a windshield glass 12 installed to a vehicle such as a car or the like. The wiper device 100 includes a pair of wipers 14, 16, a wiper motor 18, and a link mechanism 20.

The wipers 14, 16 are configured by respective wiper arms 24, 26 and wiper blades 28, 30. Base end portions of the wiper arms 24, 26 are respectively fixed to pivot shafts 42, 44, described later. The wiper blades 28, 30 are fixed to leading end portions of the wiper arms 24, 26.

In the wipers 14, 16, the wiper blades 28, 30 perform a to-and-fro operation over the windshield glass 12 accompanying operation of the wiper arms 24, 26, such that the wiper blades 28, 30 wipe the windshield glass 12.

The wiper motor 18 includes an output shaft 32 coupled through a speed reduction mechanism 52 configured mainly by a worm gear. The output shaft 32 is capable of rotating in forward and reverse directions. The link mechanism 20 includes a crank arm 34, a first link rod 36, a pair of pivot levers 38, 40, a pair of pivot shafts 42, 44, and a second link rod 46.

One end side of the crank arm 34 is fixed to the output shaft 32, and the other end side of the crank arm 34 is operably coupled to one end side of the first link rod 36. The other end side of the first link rod 36 is operably coupled to the pivot lever 38 at a location nearer to the other end of the pivot lever 38 than the end where the pivot shaft 42 is located. The two ends of the second link rod 46 are operably coupled to the pivot lever 38 at the other end of the pivot lever 38 to the end where the pivot shaft 42 is located, and to the pivot lever 40 at the end of the pivot lever 40 corresponding to the same end of the pivot lever 38.

The pivot shafts 42, 44 are movably supported by non-illustrated pivot holders provided on the vehicle body. The wiper arms 24, 26 are fixed, via the pivot shafts 42, 44, to the ends of the pivot levers 38, 40 where the pivot shafts 42, 44 are located.

In the wiper device 100 according to the present exemplary embodiment, when the output shaft 32 is rotated forwards or in reverse through a rotation angle θ1 within a predetermined range, rotation force of the output shaft 32 is transmitted to the wiper arms 24, 26 through the link mechanism 20, and the wiper blades 28, 30 perform a to-and-fro operation over the windshield glass 12 between a lower return position P2 and an upper return position P1 accompanying the to-and-fro operation of the wiper arms 24, 26. Various values may be employed as the value of θ1 according to the configuration of the link mechanism of the wiper device 100 and the like, and in the present exemplary embodiment θ1 is, for example, 110°.

As illustrated in FIG. 1, a configuration is adopted for the wiper device 100 according to the present exemplary embodiment in which the crank arm 34 and the first link rod 36 form a straight line shape when the wiper blades 28, 30 are positioned at a stowed position P3.

The stowed position P3 is provided below the lower return position P2. The wiper blades 28, 30 are operated to the stowed position P3 by rotating the output shaft 32 by θ2 from a state in which the wiper blades 28, 30 are at the lower return position P2. Various values may be employed as the value of θ2 according to the configuration of the link mechanism of the wiper device 100 and the like, and in the present exemplary embodiment θ2 is, for example, 10°.

Note that in cases in which the lower return position P2 and the stowed position P3 are aligned with each other, the rotation angle θ2 is "0" and the wiper blades 28, 30 are stopped and stowed at the lower return position P2.

A wiper motor control circuit 22 for controlling rotation of the wiper motor 18 is connected to the wiper motor 18. The wiper motor control circuit 22 according to the present exemplary embodiment includes a temperature detection circuit 90 to detect a temperature of a circuit board of the wiper motor 18 based on a signal output from a thermistor provided to the circuit board, and a microcomputer 58.

The microcomputer 58 of the wiper motor control circuit 22 controls the rotation speed of the wiper motor 18 based the detection result of a rotation angle sensor 54 for detecting the rotation speed and the rotation angle of the output shaft 32 of the wiper motor 18. The rotation angle sensor 54 is provided inside the speed reduction mechanism 52 of the wiper motor 18, and is an absolute angle sensor such as an MR (magnetic resistance) sensor that detects by converting a magnetic field (magnetic force) of a sensor magnet that rotates coupled to the output shaft 32 into a current.

Since the wiper motor 18 according to the present exemplary embodiment includes the speed reduction mechanism 52, as mentioned above, the rotation speed and rotation angle of the output shaft 32 are not the same as the rotation speed and rotation angle of a wiper motor main body. However, in the present exemplary embodiment the wiper motor main body and the speed reduction mechanism 52 are configured as an inseparable single body, and so hereinafter the rotation speed and rotation angle of the output shaft 32 are taken as being synonymous with the rotation speed and rotation angle of the wiper motor 18.

The microcomputer 58 is able to compute the position on the windshield glass 12 of the wiper blades 28, 30 from the rotation angle of the output shaft 32 detected by the rotation angle sensor 54, and controls, via a pre-driver 94, a drive circuit 56 so as to change the rotation speed of the output shaft 32 according to this computed position. The drive circuit 56 is a circuit for generating a voltage to be applied to the wiper motor 18 under control of the wiper motor control circuit 22. The drive circuit 56 generates the voltage to be applied to the wiper motor 18 by switching power from a vehicle battery acting as a power source.

A wiper switch 50 is connected to the microcomputer 58 of the wiper motor control circuit 22 through a main electronic control unit (ECU) 92 that controls a vehicle engine and the like. The wiper switch 50 is a switch that switches the supply of power from the vehicle battery to the wiper motor 18 ON or OFF. The wiper switch 50 is capable of being switched to a low speed operation mode selection position (LOW) to operate the wiper blades 28, 30 at low speed, a high speed operation mode selection position (HIGH) to operate the wiper blades 28, 30 at high speed, an intermittent operation mode selection position (INT) to operate the wiper blades 28, 30 intermittently at a fixed cycle, and a stop mode selection position (OFF). A command signal to rotate the wiper motor 18 according to the selection position of each mode is output to the microcomputer 58 through the main ECU 92 and a signal input circuit 62. For example, the wiper motor 18 is rotated at high speed when the wiper switch 50 is in the high speed operation mode selection position, the wiper motor 18 is rotated at low speed when the wiper switch 50 is in the low speed operation mode selection position, and the wiper motor 18 is rotated intermittently when the wiper switch 50 is in the intermittent operation mode selection position.

When the signal output from the wiper switch 50 according to the selection position of the corresponding mode is input to the microcomputer 58 through the main ECU 92 and the signal input circuit 62, the microcomputer 58 performs control according to the command signal from the wiper switch 50. Specifically, the microcomputer 58 reads a rotation signal of the output shaft 32 from the rotation angle sensor 54 and controls the voltage applied to the wiper motor 18 such that the wiper blades 28, 30 are operated with the desired to-and-fro wiping cycle based on the command signal from the wiper switch 50.

Figure 2:
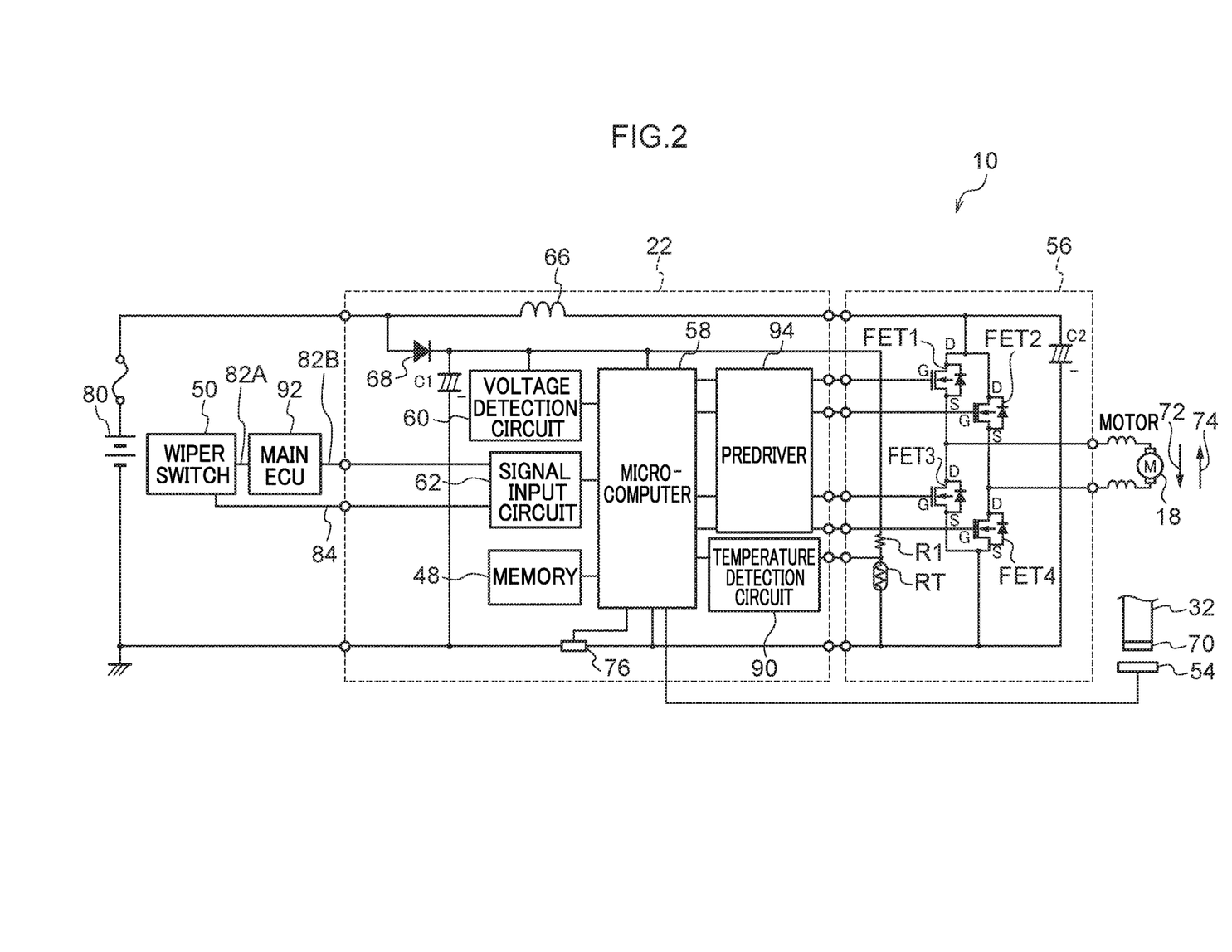
FIG. 2 is a block diagram schematically illustrating an example of a configuration of a wiper control device according to an exemplary embodiment of the present disclosure.

FIG. 2 is a block diagram schematically illustrating an example of a configuration of the wiper control device 10 according to the present exemplary embodiment. The wiper motor 18 illustrated in FIG. 2 is, for example, a brushed DC motor.

The wiper device 100 illustrated in FIG. 2 includes the drive circuit 56 for generating a voltage to be applied to terminals of a coil of the wiper motor 18, and the wiper motor control circuit 22 including the microcomputer 58 for controlling switching elements configuring the drive circuit 56 ON or OFF. Power of a battery 80 is supplied to the microcomputer 58 through a diode 68, and in addition the voltage of the supplied power is detected by a voltage detection circuit 60 provided between the diode 68 and the microcomputer 58, with the detection result being output to the microcomputer 58. The microcomputer 58 controls, via a pre-driver 94, the drive circuit 56 to generate a voltage to be applied to the coil of the wiper motor 18 while the voltage lies between a predetermined lower limit value and a predetermined upper limit value.

An electrolytic capacitor C1 is also provided with one terminal of the electrolytic capacitor C1 connected between the diode 68 and the microcomputer 58, and the other terminal (−) grounded. The electrolytic capacitor C1 is a capacitor employed to stabilize the power source of the microcomputer 58. For example, the electrolytic capacitor C1 protects the microcomputer 58 by accumulating sudden high voltages and discharging to ground.

A current detector 76 is connected to the microcomputer 58 for detecting current (motor current) flowing to the coil of the wiper motor 18 through the drive circuit 56. The current detector 76 amplifies a potential difference between two terminals of a shunt resistor having a resistance of from 0.2 mΩ to several Ω, and outputs as a signal a voltage value proportional to the current in the shunt resistor. The microcomputer 58 computes the magnitude of the motor current based on the signal output from the current detector 76, and determines the circuit to be shorted or the wiper motor 18 to be in an overloaded state when the motor current is a predetermined upper limit value or greater.

A signal for instructing the rotation speed of the wiper motor 18 is input from the wiper switch 50 to the microcomputer 58 through the main ECU 92 and the signal input circuit 62.

The rotation angle sensor 54 for detecting the magnetic field of a sensor magnet 70 as it changes according to rotation of the output shaft 32 is connected to the microcomputer 58. The microcomputer 58 identifies the position of the wiper blades 28, 30 on the windshield glass 12 by computing the rotation angle of the output shaft based on the signal output by the rotation angle sensor 54.

Furthermore, the microcomputer 58 references data stored in memory 48 of rotation speeds (target speeds) of the wiper motor 18 specified according to positions of the wiper blades 28, 30 (or rotation angles of the output shaft 32 corresponding to these positions). The microcomputer 58 then controls, via a pre-driver 94, the drive circuit 56 such that the rotation speed of the wiper motor 18 as computed based on the change in rotation angle of the output shaft 32 detected by the rotation angle sensor 54 becomes a rotation speed corresponding to the identified position of the wiper blades 28, 30.

As illustrated in FIG. 2, as switching elements, the drive circuit 56 employs a FET 1, a FET 2, a FET 3, and a FET 4, which are N-field effect transistors (FETs). The drains of the FET 1 and the FET 2 are each connected to the battery 80 through a noise prevention coil 66, and the sources of the FET 1 and the FET 2 are connected to the drains of the FET 3 and the FET 4, respectively. The sources of the FET 3 and the FET 4 are grounded.

The source of the FET 1 and the drain of the FET 3 are connected to one terminal of the coil of the wiper motor 18, and the source of the FET 2 and the drain of the FET 4 are connected to the other terminal of the coil of the wiper motor 18.

The FET 2 and the FET 3 are switched ON by a high level signal being input to the gates of the FET 2 and the FET 3, and a CW current 72 flows in the wiper motor 18 so as to, for example, operate the wiper blades 28, 30 in clockwise direction as viewed from inside the vehicle cabin. Furthermore, the voltage of the CW current 72 can be modulated by using Pulse Width Modulation (PWM) control to perform micro ON/OFF control of one out of the FET 2 or the FET 3 while the other thereof is being controlled ON.

The FET 1 and the FET 4 are switched ON by a high level signal being input to the gates of the FET 1 and the FET 4, and a CCW current 74 flows in the wiper motor 18 so as to, for example, operate the wiper blades 28, 30 in a counterclockwise direction as viewed from inside the vehicle cabin.

Furthermore, the voltage of the CCW current 74 can be modulated by using Pulse Width Modulation (PWM) control to perform micro ON/OFF control of one out of the FET 1 or the FET 4 while the other thereof is being controlled ON.

A voltage dividing circuit configured from a thermistor RT for detecting temperature and a resistor R1 is mounted on a circuit board of the drive circuit 56. The thermistor RT is an element that has a resistance that changes according to temperature. When the resistance of the thermistor RT changes, the voltage divided by the voltage dividing circuit configured from the thermistor RT and the resistor R1 also changes. The voltage divided by this voltage dividing circuit is converted into a digital signal capable of being processed by the microcomputer 58 by the temperature detection circuit 90, and this digital signal is input to the microcomputer 58. The microcomputer 58 computes the temperature of the circuit board mounted with the drive circuit 56 from the change in the voltage divided by the voltage dividing circuit configured from the thermistor RT and the resistor R1. In the present exemplary embodiment, a voltage is generated by the drive circuit 56 when the temperature detected by the thermistor RT is a predetermined upper limit value or lower.

The thermistor RT may be provided at a location other than on the circuit board mounted with the drive circuit 56, as long as it is provided a location where the temperature changes according to the load on the wiper motor 18 and the heat generation is conspicuous. For example, the thermistor RT may be mounted inside housing for the wiper motor 18 if this is possible.

In the present exemplary embodiment, the noise prevention coil 66 is provided between the drive circuit 56 and the battery 80 serving as the power source, and an electrolytic capacitor C2 is provided in parallel to the drive circuit 56. The noise prevention coil 66 is an element for suppressing noise generated by switching of the drive circuit 56.

The electrolytic capacitor C2 alleviates noise generated by the drive circuit 56, and is an element that prevents excessive current from being input to the drive circuit 56 by accumulating sudden high voltages such as surges or the like and discharging them to ground.

Figure 3A:
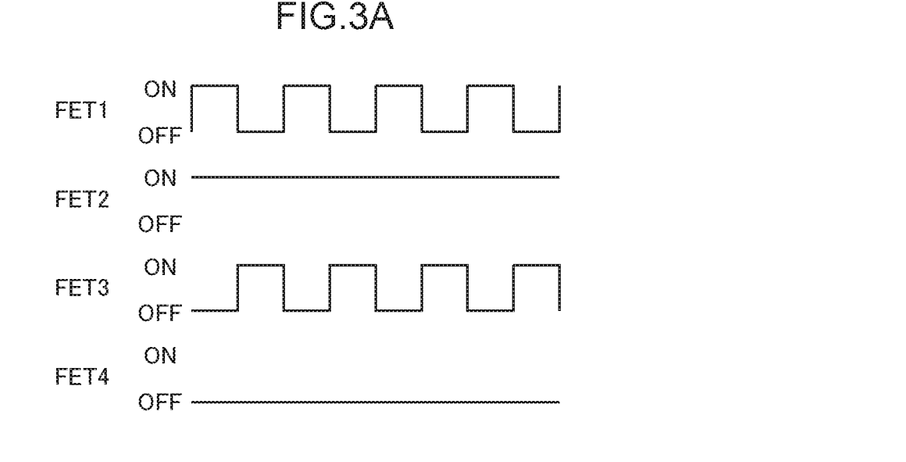
FIG. 3A is an explanatory diagram illustrating a current switching pattern during an OPEN operation in which a CW current is generated to cause wiper blades to perform a wiping action from a lower return position to an upper return position.
Figure 3B:
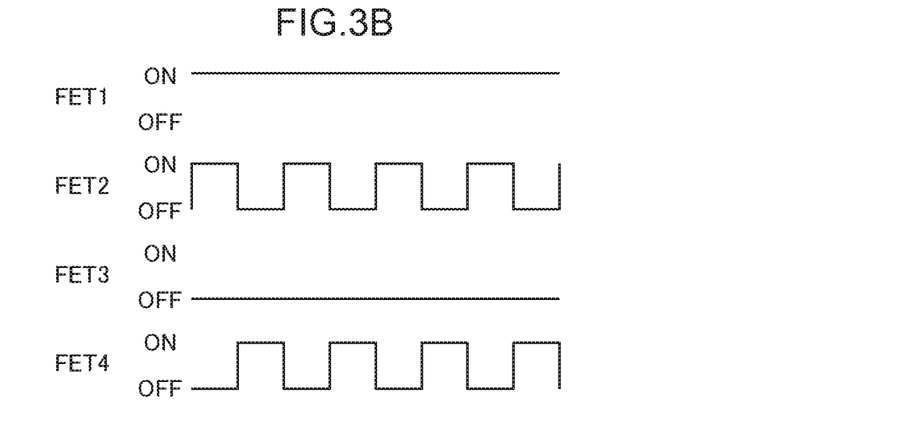
FIG. 3B is an explanatory diagram illustrating a current switching pattern during a CLOSE operation in which a CCW current is generated to cause wiper blades to perform a wiping action from an upper return position to a lower return position.
Figure 3C:
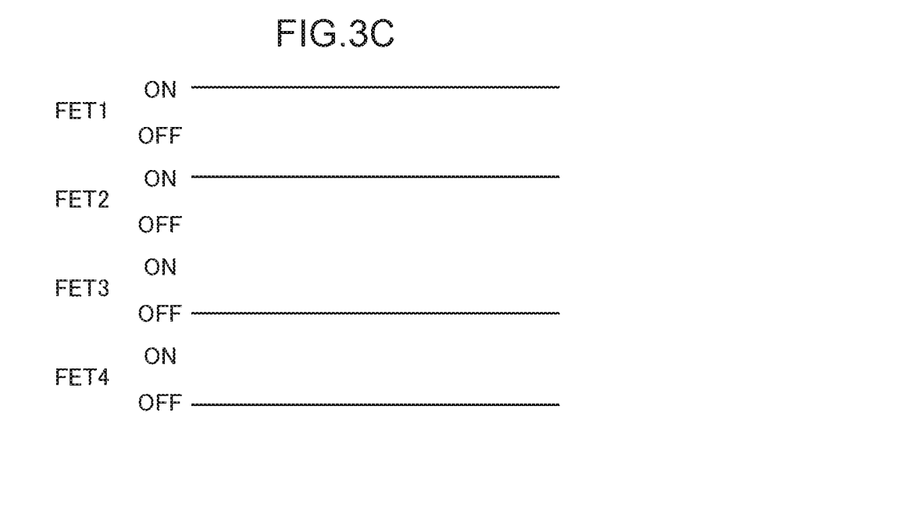
FIG. 3C is an explanatory diagram illustrating a current switching pattern to stop rotation of the wiper motor.

FIG. 3A is an explanatory diagram illustrating a current switching pattern during an OPEN operation to generate the CW current 72 to cause the wiper blades 28, 30 to perform a wiping action from the lower return position P2 to the upper return position P1. FIG. 3B is an explanatory diagram illustrating a current switching pattern during a CLOSE operation to generate the CCW current 74 to cause the wiper blades 28, 30 to perform a wiping action from the upper return position P1 to the lower return position P2. FIG. 3C is an explanatory diagram illustrating a current switching pattern to stop rotation of the wiper motor 18.

As illustrated in FIG. 3A, the rotation speed of the wiper motor 18 is controlled by performing PWM control on the FET 3 while the FET 2 is being controlled ON. The FET 1 is switched ON when the FET 3 is switched OFF. Due to the FET 2 being ON, what is referred to as a braking current is applied to the wiper motor 18. Due to the FET 2 being ON, such a braking current prevents inertial rotation of the wiper motor 18 when the FET 3 is OFF. In the present exemplary embodiment, the current switching pattern in which the FET 1 and the FET 3 are switched ON alternately while the FET 2 is in the ON state is called complementary driving.

As illustrated in FIG. 3B, the rotation speed of the wiper motor 18 is controlled by performing PWM control on the FET 4 while the FET 1 is being controlled ON. Moreover, the FET 2 is switched ON when the FET 4 is switched OFF. Due to the FET 1 being ON, a braking current is applied to prevent inertial rotation of the wiper motor 18, similarly to in the case illustrated in FIG. 3A. The case illustrated in FIG. 3B is complementary driving in which the FET 2 and the FET 4 are switched ON alternately.

As illustrated in FIG. 3C, in order to completely brake rotation of the wiper motor 18, a braking current is generated by the FET 1 and the FET 2 being switched ON, and the FET 3 and the FET 4 being switched OFF. The braking current illustrated in FIG. 3C is, for example, applied when the wiper blades 28, 30 have overrun a return position.

Figure 4:
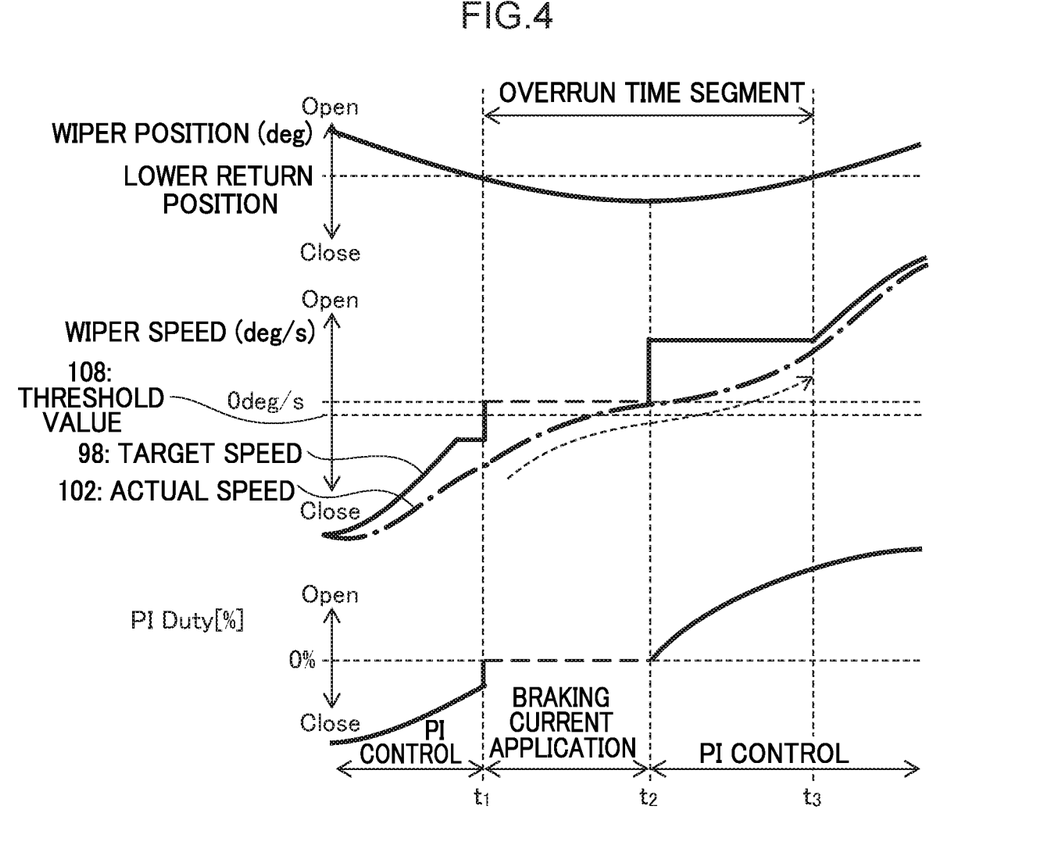
FIG. 4 is a schematic diagram illustrating correspondence relationships between wiper position, target speed, actual speed of a wiper speed, and PI Duty when the wiper blades have overrun past a lower return position in an exemplary embodiment of the present disclosure.

FIG. 4 is a schematic diagram illustrating correspondence relationships between wiper position, a target speed 98, an actual speed 102 of the wiper speed, and PI Duty when the wiper blades 28, 30 have overrun past the lower return position P2 in the present exemplary embodiment. In the case illustrated in FIG. 4, determination as to whether or not overrun has occurred is made based on whether or not the actual speed 102 of the wiper speed exceeds a threshold value 108 at a time $t_1$ when the wiper blades 28, 30 have reached the lower return position P2. The actual speed 102 is computed by the microcomputer 58 from the change in rotation angle of the output shaft 32 detected by the rotation angle sensor 54. The actual speed 102 is correlated to the rotation speed of the output shaft 32, and so may be taken as being synonymous with the rotation speed of the wiper motor 18.

In the case illustrated in FIG. 4, the threshold value 108 is set to a value smaller than 0 deg/s, namely, to a negative value. Determination is made that overrun has not occurred when the absolute value of the actual speed 102 is the absolute value of the threshold value 108 or smaller. Determination is made that overrun has occurred when the absolute value of the actual speed 102 has exceeded the absolute value of the threshold value 108.

The target speed 98 is 0 deg/s at time $t_1$, and is a predetermined value of 0 deg/s or greater from time $t_2$ to time $t_3$. The predetermined value from time $t_2$ to time $t_3$ is set to rapidly accelerate the wiper speed when the wiper blades 28, 30 that have stopped at the lower return position P2 change direction at the lower return position P2.

In the case illustrated in FIG. 4, when the wiper blades 28, 30 have overrun at time $t_1$, the overrun is suppressed by halting PI control to decide a PI duty to eliminate deviation between the target speed 98 and the actual speed 102, and applying a braking current until time $t_2$ such that the actual speed 102 becomes 0 deg/s, namely, so that rotation of the wiper motor 18 is stopped completely. The PI control is then resumed from time $t_2$, and current is applied in the opposite direction (as a reverse current) to that of the current up to time $t_1$. The PI control from time $t_2$ is, for example, performed to decide a PI duty that eliminates deviation between the target speed 98 and the actual speed 102 by time $t_3$, and the actual speed 102 changes so as to follow the target speed 98. As a result, even if overrun of the wiper blades 28, 30 occurs, the actual speed 102 is changed smoothly, and hunting or sudden acceleration in the wiper speed can be suppressed from occurring.

Figure 5:
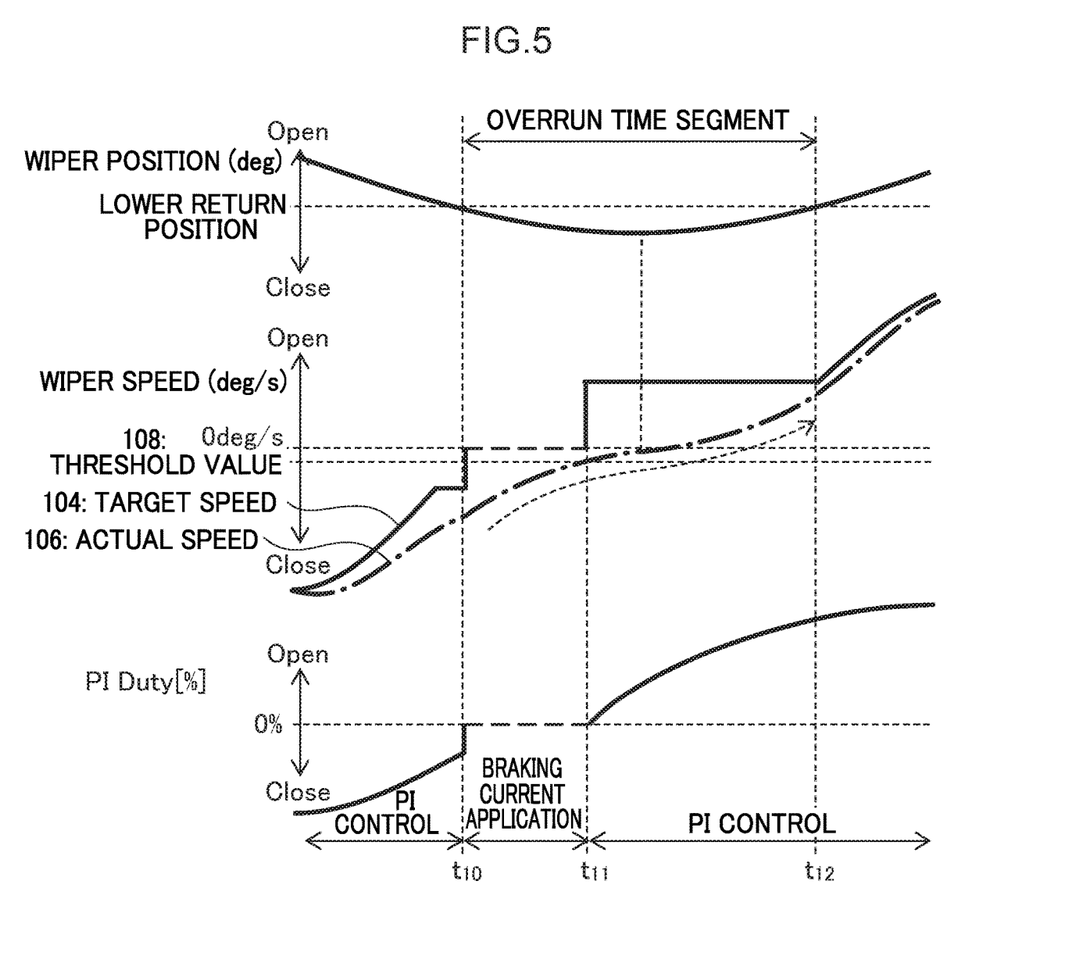
FIG. 5 is a schematic diagram illustrating another example of correspondence relationships between wiper position, target speed, actual speed of a wiper speed, and PI Duty when the wiper blades have overrun past a lower return position in an exemplary embodiment of the present disclosure.

FIG. 5 is a schematic diagram illustrating another example of correspondence relationships between wiper position, a target speed 104, and actual speed 106 of the wiper speed, and PI Duty when the wiper blades 28, 30 have overrun past the lower return position P2 in the present exemplary embodiment. In the case illustrated in FIG. 5, similarly to the case illustrated in FIG. 4, determination as to whether or not overrun has occurred is made based on whether or not the actual speed 106 of the wiper speed exceeds a threshold value 108 at a time $t_{10}$ when the wiper blades 28, 30 have reached the lower return position P2. The actual speed 106 is, similarly to the actual speed 102 in FIG. 4, computed by the microcomputer 58 from the change in rotation angle of the output shaft 32 detected by the rotation angle sensor 54.

In the case illustrated in FIG. 5 too, the threshold value 108 is set as a negative value. Determination is made that overrun has not occurred when the absolute value of the actual speed 106 is the absolute value of the threshold value 108 or smaller. Determination is made that overrun has occurred when the absolute value of the actual speed 106 has exceeded the absolute value of the threshold value 108.

The target speed 104 is 0 deg/s at time $t_{10}$, and is a predetermined value of 0 deg/s or greater from time $t_{11}$ to time $t_{12}$. The predetermined value from time $t_{11}$ to time $t_{12}$ is, similarly to in the case illustrated in FIG. 4, set to rapidly accelerate the wiper speed when the wiper blades 28, 30 that have stopped at the lower return position P2 change direction at the lower return position P2.

In the case illustrated in FIG. 5, when the wiper blades 28, 30 have overrun at time $t_{10}$, the overrun is suppressed by halting PI control to decide a PI duty to eliminate deviation between the target speed 104 and the actual speed 106, and applying a braking current until time $t_{11}$ such that the actual speed 106 is decelerated to the threshold value 108. The PI control is then resumed from time $t_{11}$, and current is applied in the opposite direction to that of the current up to time $t_{11}$. The PI control from time $t_{11}$ is, for example, performed to decide a PI duty that eliminates deviation between the target speed 104 and the actual speed 106 by time $t_{12}$, and the actual speed 106 changes so as to follow the target speed 104. As a result, even if overrun of the wiper blades 28, 30 occurs, the actual speed 106 is changed smoothly, and hunting or sudden acceleration in the wiper speed can be suppressed from occurring.

In the case illustrated in FIG. 5, since the braking current application is not maintained until the rotation of the wiper motor 18 has completely stopped, the duration of the braking current is shorter than that in the case illustrated in FIG. 4. As a result, the PI control can be resumed faster than in the case illustrated in FIG. 4.

Figure 6:
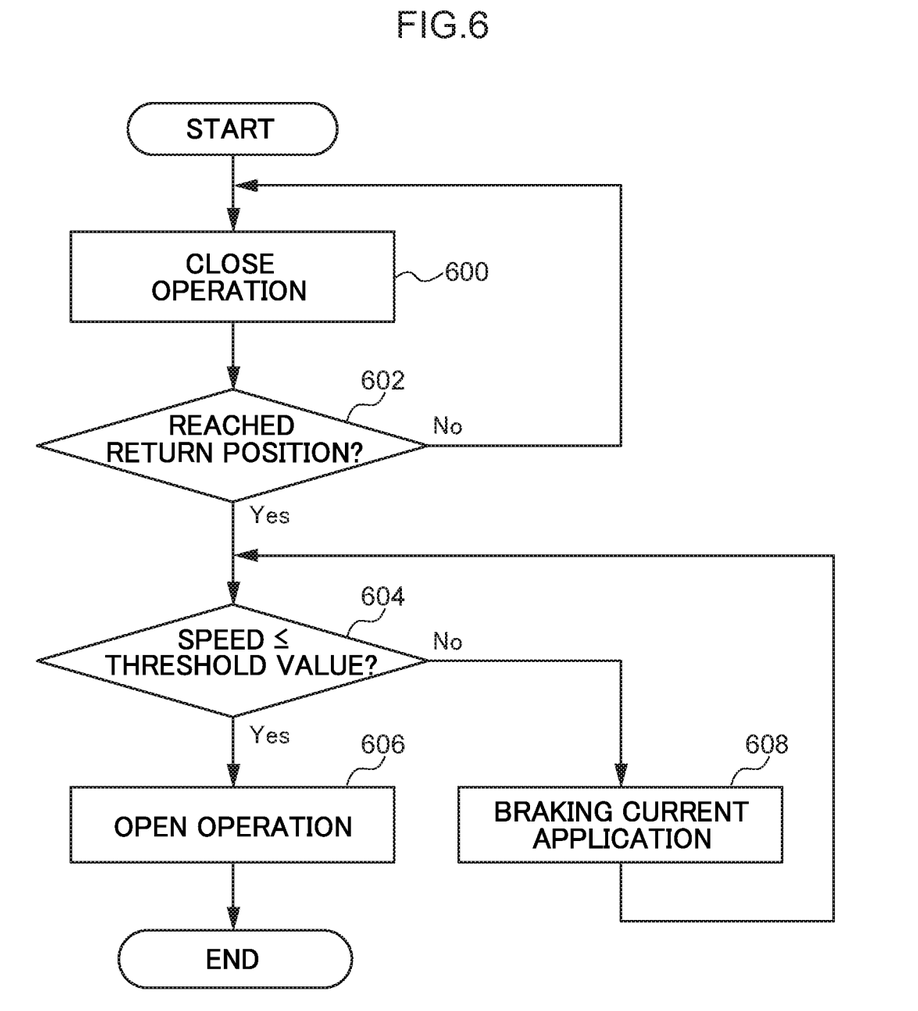
FIG. 6 is a flowchart illustrating an example of current switching processing in a wiper control device according to an exemplary embodiment of the present disclosure.

FIG. 6 is a flowchart illustrating an example of current switching processing in the wiper control device 10 according to the present exemplary embodiment. At step 600, a CLOSE operation is performed to cause the wiper blades 28, 30 to perform a wiping action from the upper return position P1 to the lower return position P2.

Determination is made at step 602 as to whether or not the wiper blades 28, 30 have reached the lower return position P2. The routine transitions to step 604 when the wiper blades 28, 30 have reached the lower return position P2. The routine transitions to step 600 when the wiper blades 28, 30 have not reached the lower return position P2, and the CLOSE operation is continued.

Determination is made at step 604 as to whether or not the actual speed 102, 106 of the wiper speed is the predetermined threshold value 108 or lower. As illustrated in FIG. 4 and FIG. 5, when the threshold value 108 is set to a value smaller than 0 deg/s, namely, to a negative value, the determination at step 603 is whether or not the absolute value of the actual speed 102, 106 is the absolute value of the threshold value 108 or lower.

When at step 604 the actual speed 102, 106 is the threshold value 108 or lower, at step 606 processing is performed to perform an OPEN operation to cause the wiper blades 28, 30 to change direction at the lower return position P2 and perform a wiping action to the upper return position P1, after which processing is ended.

At step 604, when the actual speed 102, 106 exceeds the threshold value 108, a braking current is applied at step 608. The braking current may, as in the case illustrated in FIG. 4, be continued until the actual speed 102 becomes 0 deg/s, or may, as in the case illustrated in FIG. 5, be continued until the actual speed 106 becomes the threshold value 108. After applying the braking current at step 608, the routine transitions to step 604, and determination is made as to whether or not the actual speed 102, 106 is the threshold value 108 or lower.

As an example, FIG. 6 illustrates a case in which the wiper blades 28, 30 overrun the lower return position P2. When overrun has occurred at upper return position P1, configuration may be made such that the OPEN operation is performed at step 600 in FIG. 6, determination is made as to whether or not the wiper blades 28, 30 have reached the upper return position P1 at step 602, and the CLOSE operation is performed at step 606.

As described above, in the present exemplary embodiment, when the wiper blades 28, 30 have overrun a return position, the PI control is temporarily halted, and the overrun is suppressed by applying a braking current to decelerate the wiper speed. As a result, rapid acceleration of the wiper speed of the wiper blades 28, 30, or hunting in the wiper blades 28, 30, after changing direction can be suppressed from occurring.

Since a regenerative current is generated in the wiper motor 18 as it rotates at overrun, the load on the wiper motor 18 would normally increase when a reverse current is applied to the wiper motor 18 to change the direction of the wiper blades 28, 30 in such a state. However, this is not the case if the rotation of the wiper motor 18 has been braked in advance by a braking current at overrun. Although a regenerative current is still generated in the wiper motor 18 as it rotates when a braking current is applied, the load on the wiper motor 18 is less than in it would be were a reverse current to be applied in such a state, and so damage to the wiper motor 18 can be prevented. Alternatively, contributions can be made to reducing the size and cost of the wiper device due to being able to make the rating of the wiper motor 18 smaller than cases in which braking current is not applied.

What is claimed is:

1. A wiper control device comprising:
   a drive circuit that drives a wiper motor so as to cause a wiper blade to perform a wiping action;
   a rotation angle detection sensor that detects a rotation angle of an output shaft of the wiper motor; and
   a control circuit that:
   (i) controls the drive circuit based on the rotation angle detected by the rotation angle detection sensor, such that a rotation speed of the wiper motor becomes a target speed corresponding to a wiping position of the wiper blade determined according to the rotation angle, and
   (ii) controls the drive circuit to apply a braking current in the wiper motor when (a) the wiper blade has reached a return position of the wiper blade as determined according to the rotation angle and (b) at a time at which the wiper blade reaches the return position, the rotation speed of the wiper motor, determined from a change in rotation angle of the output shaft of the wiper motor, exceeds a fixed threshold value, wherein
   the control circuit determines that the rotation speed of the wiper motor exceeds the fixed threshold value by comparing the rotation speed of the wiper motor, determined from the change in the rotation angle of the output shaft of the wiper motor, to a threshold speed.

2. The wiper control device of claim 1, wherein, when the braking current is applied, the control circuit continues application of the braking current until the rotation speed of the wiper motor becomes the fixed threshold value or lower.

3. The wiper control device of claim 1, wherein, when the control circuit controls the drive circuit based on the rotation angle, the control circuit performs PI control based on deviation between the rotation speed and the target speed, halts the PI control during application of the braking current, and resumes the PI control when the application of the braking current has ended.

4. The wiper control device of claim 2, wherein, when the control circuit controls the drive circuit based on the rotation angle, the control circuit performs PI control based on deviation between the rotation speed and the target speed, halts the PI control during application of the braking current, and resumes the PI control when the application of the braking current has ended.

5. The wiper control device of claim 1, wherein the control circuit continues application of the braking current until the rotation speed of the wiper motor has become zero.

6. The wiper control device of claim 2, wherein the control circuit continues application of the braking current until the rotation speed of the wiper motor has become zero.

7. The wiper control device of claim 3, wherein the control circuit continues application of the braking current until the rotation speed of the wiper motor has become zero.

8. The wiper control device of claim 4, wherein the control circuit continues application of the braking current until the rotation speed of the wiper motor has become zero.

9. A wiper control device comprising:
a drive circuit that drives a wiper motor so as to cause a wiper blade to perform a wiping action;
a rotation angle detection sensor that detects a rotation angle of an output shaft of the wiper motor; and
a control circuit that:
(i) controls the drive circuit based on the rotation angle detected by the rotation angle detection sensor, such that a rotation speed of the wiper motor becomes a target speed corresponding to a wiping position of the wiper blade determined according to the rotation angle, and
(ii) controls the drive circuit to apply a braking current in the wiper motor when (a) the wiper blade has reached a return position of the wiper blade as determined according to the rotation angle and (b) at a time at which the wiper blade reaches the return position, the rotation speed of the wiper motor, determined from a change in rotation angle of the output shaft of the wiper motor, exceeds a threshold value, wherein
when the control circuit controls the drive circuit based on the rotation angle, the control circuit performs PI control based on deviation between the rotation speed and the target speed, halts the PI control during application of the braking current, and resumes the PI control when the application of the braking current has ended.

10. The wiper control device of claim 9, wherein, when the braking current is applied, the control circuit continues application of the braking current until the rotation speed of the wiper motor becomes the threshold value or lower.

11. The wiper control device of claim 10, wherein the control circuit continues application of the braking current until the rotation speed of the wiper motor has become zero.

12. The wiper control device of claim 9, wherein the control circuit continues application of the braking current until the rotation speed of the wiper motor has become zero.

* * * * *